Sept. 1, 1964  E. HURST  3,146,560
ABRASIVE PRODUCTS
Filed June 14, 1960  7 Sheets-Sheet 1

INVENTOR.
EDWARD HURST
BY
ATTORNEY

Sept. 1, 1964 E. HURST 3,146,560
ABRASIVE PRODUCTS

Filed June 14, 1960 7 Sheets-Sheet 2

Sept. 1, 1964   E. HURST   3,146,560
ABRASIVE PRODUCTS
Filed June 14, 1960   7 Sheets-Sheet 3

Sept. 1, 1964    E. HURST    3,146,560
ABRASIVE PRODUCTS
Filed June 14, 1960    7 Sheets-Sheet 4

3,146,560
ABRASIVE PRODUCTS
Edward Hurst, Duxbury, Mass., assignor to Rexall Drug
and Chemical Company, Los Angeles, Calif., a corporation of Delaware
Filed June 14, 1960, Ser. No. 35,971
22 Claims. (Cl. 51—188)

This invention relates to novel articles of manufacture for use in the abrasive arts.

Traditionally, there has been an important distinction between coated abrasives and bonded abrasives. A coated abrasive consists of a flexible backing to which a coating or layer of abrasive grains is bonded. The usual backings include paper, cloth, and vulcanized fiber. Abrasive articles of this type are valuable because of their flexibility, but are limited in useful life because the layer of grains is substantially only a single grain deep, and in practice only a portion of a given grain is actually available for abrasive action.

A bonded abrasive article consists of a mass of abrasive grain that is bonded together. The "depth" of the abrasive grain in the article is coextensive with that of the article itself. Vitrified, ceramic, and resinoid bonds are common, and in recent years, flexible bonded abrasive articles have been introduced that employ fibrous materials, often with a resin, as the bond for the abrasive grain. A bonded abrasive article is usually characterized by a relatively long life as compared to a coated abrasive article, because of the greater mass of abrasive that is available.

These two types of abrasive articles have usually been considered to be mutually exclusive, because of their different natures. This distinction between the two types of abrasives has resulted in the proliferation of manufacturing facilities for manufacturing abrasive articles of one type or the other. Separate technologies have developed about the different types of abrasive articles, and the larger abrasive manufacturers usually have separate and distinct manufacturing facilities for the different types. This has caused a very considerable amount of specialization in training, technique, and in machinery, that imposes a burden on the industry.

There is therefore an opportunity for considerable savings, if some way can be found to unify the technology involved in the production of abrasive articles of the two types.

There is also a very considerable opportunity for improvement in the existing technologies. For example, the designer of a grinding wheel is confronted with a dilemma. On the one hand, he wishes to use a bond for the abrasive grain that is sufficiently strong so that the wheel will not fly apart under centrifugal force, even at extremely high operating speeds, or even under extreme conditions of use. On the other hand, the bond must gradually break down during use, so that the abrasive wheel will have the free cutting action that is necessary for efficient operation. No bond has yet been found that combines the characteristics of entirely adequate strength with satisfactory breakdown characteristics during use, and it is for this reason that reinforcements are often used in grinding wheels.

The use of a reinforcement is a compromise that provides a rotary grinding tool with increased strength. Randomly disposed short lengths of fibrous materials of relatively low intrinsic strength have been employed as internal reinforcements in grinding wheels, with the intention that these reinforcements would break down sufficiently at the grinding face so as not to interfere with the grinding action. Stronger reinforcements, such as steel bars and rods, have also been employed as internal reinforcements in rotary grinding tools, but have the disadvantage that they render useless that part of the abrasive article that contains the reinforcing element. Such intrinsically strong reinforcing elements must terminate in radially spaced relation to the grinding face of the tool, so as not to become exposed as the tool is worn away in use, since a projecting steel part would interfere with the grinding action and render the tool useless.

External reinforcing elements, such as side flanges, wire wrappings, and other external members, are often used. These ordinarily extend almost to the wheel periphery or grinding face. Such reinforcing elements are designed to lessen the dangers from wheel breakage as much as possible, without interfering with wheel usefulness and utilization. However, in many cases, such external aids are not entirely satisfactory and do not materially increase the rate at which a rotary tool may be used safely.

For extremely large rotary grinding tools that are intended to grind with their side faces, rather than with their peripheral faces, such as, for example, the large annular wheel used in a Blanchard grinder, a heavy, external wire has been used as a reinforcing element at the peripheral face. Such an expedient is of limited value inasmuch as it is not applicable to other types of rotary grinding tools, and moreover, the peripheral strength is not matched by corresponding strength inwardly of the periphery.

There are other examples that are available to demonstrate the need for improvement in present techniques. As is often the case, however, the opportunity for improvement may be difficult to observe in the absence of a concrete solution in the form of a new manufacturing process that improves upon existing technique and makes obvious preexisting but previously unappreciated inefficiency. In the bonded abrasive field, another specific example of an area for improvement will be described, better to formulate the problems in the art.

The abrasive industry makes wide use of woven glass cloth for reinforcing purposes. This is an expensive material because weaving the glass yarns to make the woven cloth is an expensive process. The user of the woven glass cloth must treat it before use with a resin, dry the resin, and then die out the cloth to the desired shape. The cloth is then ready to be added to the abrasive. If the present manufacturing processes are broken down into the steps just described, it can be seen that many individual high cost operations are involved.

An example of an opportunity for improvement in the coated abrasive field can be found in connection with setup wheels. The essential useful characteristics of setup wheels are their high rate of cut and resilience. The useful life between setups, that is, between the times for renewal of the coating of abrasive grain, tends to be relatively short. The relatively short effective life entails high costs, because more than one wheel must be available to permit continuous operations, and because each setup (that is, disassembly of the wheel and removal of the backing, application of a fresh abrasive coating, and reassembly of the wheel) requires 24 to 36 hours. Setup wheels are widely used despite these drawbacks, and despite the availability of abrasive belts, segmental coated abrasive products, and other abrasive articles that can be used instead of setup wheels.

Ordinarily, setup belts, discs, and buffs are not made because of the difficulties that are inherent in renewing the abrasive coating. Moreover, the method of driving belts and discs imposes limitations that are not found in wheels. Nevertheless, some of the performance characteristics of the setup wheel would be very desirable in belts, discs, and buffs, but under present conditions are unattainable.

One object of the present invention is to provide a new type of abrasive article that is useful for polishing, grinding and cutting.

Another object of the invention is to provide an abrasive article that is useful for polishing, grinding, and cutting operations of the type usually performed by coated abrasive articles, but that has a much longer life and much greater strength than conventional abrasive articles of the coated type.

Another object of the invention is to provide a reinforced abrasive unit that can be fabricated into abrasive products that are analogous to and that have applications comparable to those of conventional coated and bonded abrasive articles, and that can also be employed for reinforcing a conventional bonded abrasive article such as a grinding wheel.

Another object of the invention is to provide a novel reinforced abrasive unit that can be used as a conventional coated abrasive product would be used, or alternatively, that can be used for the fabrication of a reinforcing element for a bonded abrasive product, or that affords the further alternative of use for the fabrication of an abrasive article of the bonded type.

Another object of the present invention is to provide a reinforcing element for a rotary abrasive article that will impart to the article satisfactory characteristics of strength without interfering with the normal grinding action, without limiting the availability of the abrasive article for complete utilization, and without the need for external reinforcing.

Another object of the invention is to provide practical internal reinforcing elements for rotary abrasive articles and for wheels that grinding with their side faces rather than their peripheral faces, and that will impart sufficient strength to the abrasive article substantially to eliminate the need for external reinforcement.

A more specific object of the invention is to provide an improved and practical internal reinforcing element for a rotary, conventional type of resinoid-bonded abrasive article.

Another specific object of the invention is to provide a novel, practical internal reinforcing element for a flared cup wheel.

Another specific object of the invention is to provide a satisfactory reinforcing element for a mounted point.

A further and more general object of the invention is to provide a reinforced abrasive unit that can be fabricated into abrasive articles that have superior durability and abrading characteristics as compared to conventional coated abrasive products, and that can be used for many abrading applications of diverse nature.

Another object of the invention is to provide new high strength, internally reinforced abrasive articles, and simple and economical new processes for making them.

Another object of the invention is to provide an abrasive product that is useful per se as an abrading element, and that can be fabricated by simple techniques into an abrasive article of more complicated structure and that is analogous in some of its characteristics and in its application potential to an abrasive article of the bonded type.

Still another object of the invention is to provide a novel type of friction material that can be used, for example, as an antiskid surfacing material.

Yet another object of the invention is to provide new and useful abrasive structures, different in structure from, but analogous in function to, known abrasive articles including coated sheets, endless belts, discs, grinding wheels, and the like, and having unusual construction, superior strength, and greater durability, and in many cases permitting a faster rate of cut, than such prior art abrasive articles.

Still a further object of the invention is to provide new abrasive products that have the advantageous performance characteristics of the setup wheel but that are free from the inherent disadvantages of the setup wheel, and that can be employed to advantage for abrading applications where belts, discs and buffs of the conventional type would ordinarily be employed.

Other objects of the invention will be apparent hereinafter from the specification and from the recital of the appended claims.

The present invention provides novel abrasive articles. These abrasive articles can be used themselves for polishing, grinding, and cutting. They can be fabricated into abrasive products of more complicated structure. They can be made into reinforcing elements for bonded abrasive articles of conventional type. They can be fabricated themselves directly into bonded abrasive articles.

This invention is based upon a new concept both as to manufacturing techniques and as to the structure of the abrasive products produced. All of the novel abrasive products of the present invention are based upon a modular concept of a reinforced abrasive unit. This unit can be used itself for abrasive purposes, or it can be fabricated into a wide variety of structures that are useful for abrading purposes and also for reinforcing other abrasive products.

To produce the reinforced abrasive unit of this invention, in accordance with one embodiment of the invention, a plurality of flexible linear-filiform reinforcing members are immersed in a bath of a high viscosity resin, collected in a bundle, and are continuously withdrawn from the bath through a discharge orifice of restricted size. Resin is continuously supplied to this orifice under sufficient pressure that there is a continuous substantially uniform withdrawal through the orifice of a soft, workable mass of the resin and the reinforcing members. As this soft mass is withdrawn through the orifice, a metered amount of abrasive grain is supplied continuously either to one or more selected surfaces of the mass or entirely about the mass, and the grain and mass together are immediately expressed between pressure bearing members that press the abrasive grain into the mass to embed at least a part of it in the mass. While the quantity of abrasive grain that is employed can be adjusted to substantially any desired practical amount, it is preferred to use sufficient grain so that the marginal portion of the expressed material has abrasive grain embedded therein to a depth greater than one grain in thickness.

The material emerging from the pressure bearing members is a continuous, elongate, mass that is adhesively bonded together by the resin. This material preferably is passed directly into a zone in which the resin is advanced at least sufficiently to bond the abrasive grain and reinforcing members together to permit handling. If the material is intended for use itself in its then shape as an abrasive article, the resin can be advanced sufficiently to harden or cure it.

When the resin is only advanced sufficiently to be non-tacky and to permit handling, the product is an elongate coherent flexible mass having a resin matrix in which a bundle of separate flexible linear-filiform reinforcing members is embedded. The reinforcing members are disposed to extend in a generally longitudinal direction, and the abrasive grains are distributed in depth at and adjacent the surface, and are bonded in position by the resin.

There are several very important practical applications for the reinforced abrasive unit that is formed by advancing the resin only sufficiently to permit handling. The details of the structures of the many products that can be fabricated from this unit, according to the present invention, and the methods of making these structures, and the several uses to which they can be put, can best be understood by reference to the drawings and to the detailed description thereof that follow.

In the drawings:

FIG. 1 is a schematic diagram on an enlarged scale, and in a section taken in a vertical plane, illustrating one way of making a reinforced abrasive unit in accordance with one embodiment of this invention;

FIG. 2 is a fragmentary perspective view on an enlarged scale of a reinforced abrasive unit made in accordance with one embodiment of this invention, and showing a bundle of six separate flexible linear-filiform reinforcing members that are juxtaposed and embedded within the resin matrix of the unit, the reinforcing members being extended in the drawing beyond the resin and abrasive grain, better to illustrate them, and one of these members being opened slightly at its exposed end to show that it is formed from a plurality of twisted fibers;

Figure 1:
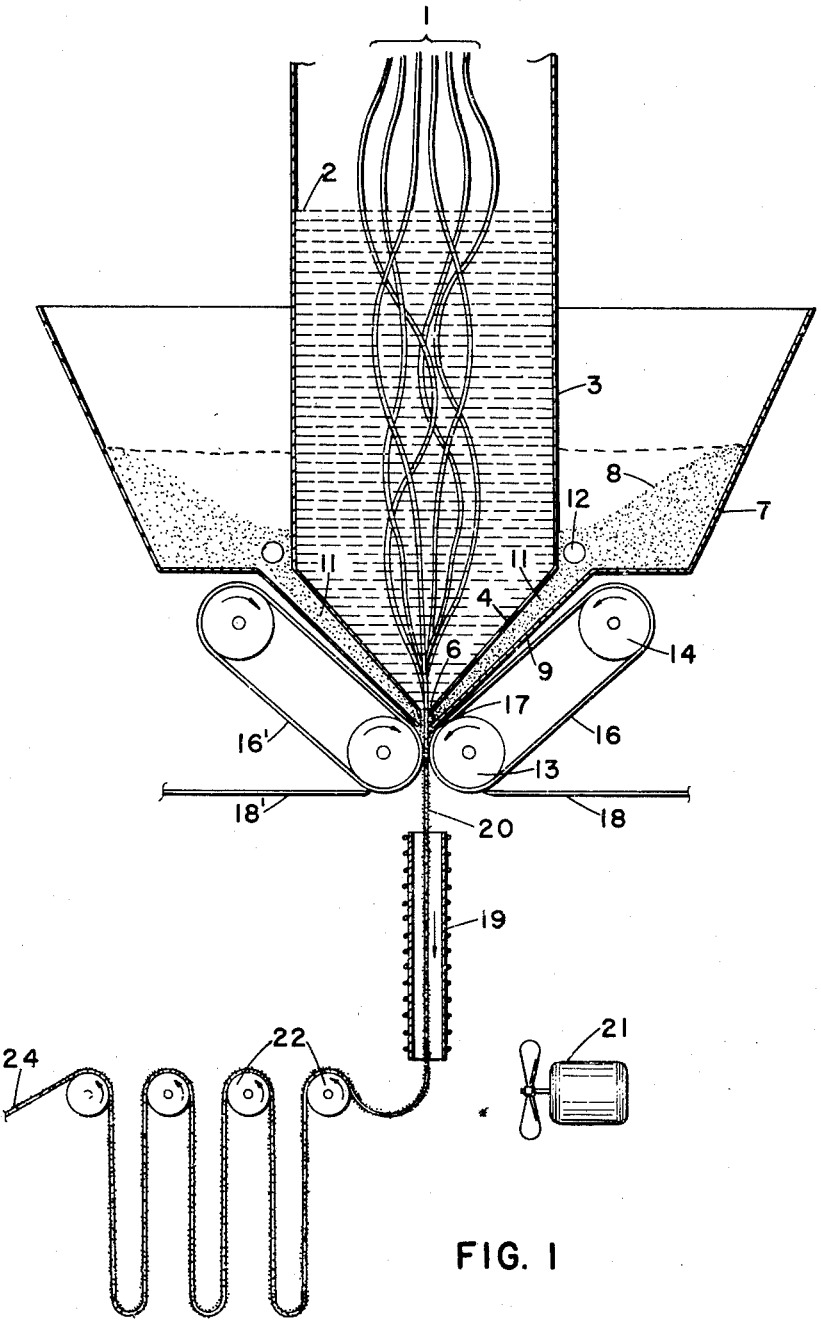

Referring now in detail to FIG. 1, the numeral 1 denotes a plurality of strands, each of which is formed from glass fibers that are twisted together. These strands 1 are supplied continuously under little or no tension to a bath 2 of a liquid resin or other binder material that is maintained at a predetermined viscosity in a tank 3. The tank 3 is formed with a generally conical bottom 4 that has a discharge slot 6 at its lowermost portion.

The number of strands that are employed depends upon the desired size of the reinforced abrasive unit and upon the strength desired; from 4 to 6 strands are preferred.

The liquid binder in the bath 2 preferably is a phenolic resin but may be another suitable adhesive liquid material such as, for example, animal glue, compounded neoprene, and the like; or a synthetic resin such as a resorcinol-formaldehyde resin, or an aniline-formaldehyde, polyester, silane, epoxy or polyurethane resin.

The slot 6, at the bottom of the tank 3, permits the discharge of a suitable amount of the liquid binder with the strands. Preferably, the size of the discharge slot is adjustable to facilitate control over the amount of resin or other liquid material that is discharged. Other factors that have a direct effect upon the rate of escape of the liquid through the discharge slot include the viscosity of the liquid, its surface tension, the time of immersion of the strands, the temperature of the strands prior to immersion, the amount of tension under which the strands are maintained in the bath, the temperature of the discharge slot, the rate at which the strands are moved through the discharge slot, the amount of friction at the discharge slot, the amount of air entrapment or foam formation in the liquid, and the tension under which the strands are maintained in the bath. If the liquid is highly viscous, an agitator (not shown) may be operated in the bath to minimize cavitation and insure adequate strand-resin contact.

The structures that are mounted beneath the conical bottom 4 and adjacent the lower end of the tank 3 are generally symmetrical about a vertical plane through the discharge slot 6, and accordingly, the description of the structure at one side of the slot 6 will be understood to apply to the structure at the other side of the slot as well, except for orientation.

A bin 7 is mounted at the lower end of the upright portion of the wall of the tank 3, for holding a supply of abrasive grain 8. An inclined slide 9 is mounted beneath the conical bottom 4 of the tank 3, to provide a passageway from the interior of the bin 7, along the bottom of the tank 4, to discharge adjacent the slot 6. The inclination of the slide 9 is such that the passage 11 has a progressively decreasing capacity from its upper end to its lower end. A metering device 12 is mounted in the bin 7 adjacent the upper end of the passage 11, to provide a continuous flow of abrasive grain 8 from the interior of the bin 7 into the passageway 11. A vibrator (not shown) may be mounted to vibrate the slide 9 to facilitate flow of the abrasive grain through the passage 11.

A driven roll 13 and an idler roll 14 are mounted beneath the slide 9, and a narrow belt 16 is mounted for travel about the two rolls, and is disposed to form a nip 17 with the corresponding symmetrical belt 16'. The belt 16 is mounted for rotation in a counterclockwise direction, and the belt 16' is mounted for rotation in a clockwise direction. Both belts are formed from a material to which the liquid binder does not readily adhere, such as, for example, polytetrafluoroethylene, a silicone-surfaced material, or the like. The nip 17 between the two belts is disposed immediately beneath the discharge slot 6 and the discharge ends of the passageways 11 and 11' respectively. The ends of this nip are closed by stationary, adjustable dams (not shown).

Precision ground stainless steel scrapers 18, 18' are mounted to engage against the surfaces of the belts 16, 16' respectively, at their lower sides, to remove any adherent abrasive grain.

A heating oven 19, preferably radiantly heated, is disposed below the nip 17 and is formed to provide an elongate passage or zone through which the material 20 that is extruded from between the belts can travel while being heated. A fan 21, or other source of cold air, is mounted adjacent the lower, discharge end of the oven 19, to supply cool air for chilling the material leaving the oven. A festoon dryer 22, of the conventional type, is provided for further curing of the material.

In operation of this apparatus for the production of a reinforced abrasive unit, in accordance with one preferred way of practicing the invention, six strands 1, each of which was formed from twisted glass fibers, were fed into a bath 2 of a thermosetting phenolic resin. The strands were fed in at a rate that permitted the individual strands to be slack and to bend back and forth in the resin. The viscosity of the resin and the time of immersion were carefully controlled to insure adequate resin pickup by each strand.

As the strands 1 were passed through the long, relatively narrow, discharge slot 6, they were aligned in substantially a single layer six strands wide. The strands at this point were not contiguous along their lateral sides; each strand was embedded in and substantially surrounded by a layer of the resin.

As the strands embedded in the resin passed through the discharge slot 6, abrasive grain was continuously applied, and the mass was immediately drawn into the nip 17 and continuously expressed between the opposed moving belts 16, 16'. The belts pressed the grain into the mass and formed the mass into an extruded shape 20 of desired dimensions and, as illustrated in FIG. 1, of ribbon-like form.

The extruded material 20 was passed through the oven 19, in which it was radiantly heated to advance the resin. At the discharge end of the oven, the material was subjected to a stream of cool air from the fan 21, to lower the temperature of the material and to render the resin less susceptible to flow. The material was then passed over a festoon drier 22, in which the resin was dried slowly at room temperature. After the resin had been carefully and slowly dried, the reinforced abrasive unit 24 was withdrawn from the festoon dryer by a tensioning device. It remained flexible for several days and was easily stored on spools.

For successful practice of the invention, the rate of supply of the strands, resin, and abrasive grain to the extrusion nip 17, and, as well, the speed of the belts 16 and 16' respectively, had to be carefully controlled. The speed of the belts was such that the abrasive grains that were discharged from the passages 11, 11' respectively were immediately pressed into the soft mass from the discharge slot 6 and were immediately carried away. If this condition was not met, trouble occurred because of flow of the resin upwardly into the passages 11, 11'.

This process for the production of the reinforced abrasive unit permits the positioning of glass fiber yarns or other reinforcing members and abrasive grains concurrently in a matrix of resin, so that upon advancement or complete curing of the resin, there is a substantial reinforcement of the unit without impairment of the abrasive action that can be obtained.

By way of example, one ribbon-like extruded product was ¼" wide and 0.040" thick. This has been found to be a very useful size but extruded materials having other dimensions have been produced by the same general technique.

The relative proportions of strands, resin, and abrasive grain in the extruded material can be adjusted to make the material more easily adapted for a particular end use. The amount of grain that is supplied to the extrusion nip is easily controlled by adjusting the metering equipment. Some of the many factors that influence the amount of resin in the mass that is fed into the extrusion nip 17 have already been mentioned; one of the most influential of these factors is the size of the discharge slot 6 relative to the aggregate cross sectional area of the strands.

For simplicity in manufacturing, the discharge slot 6 and the extrusion nip 17 are both generally rectangular. However, they could be triangular or circular in cross-section, or of other desired cross-section, if necessary.

In some cases, it is advantageous to have the abrasive grain, that is supplied to the bin 7, precoated with resin to improve the bond between the individual particles of abrasive grain and the resin. Spraying, dipping, or application of the resin in powder form, or other known techniques, can be employed to precoat the individual abrasive particles. Abrasive grain of crushed fused alumina, of 24 grit size, has been precoated with a phenolic resin by carrying the abrasive grain on a conveyor belt, in a bed substantially one grain thick, beneath a spray of a phenolic resin solution. Very little resin is needed for an effective precoat, and drying at room temperature is extremely rapid. If necessary, infra-red heating lamps can be employed to accelerate drying.

While the foregoing preferred practice of the invention has been described in specific terms for clarity, it will be understood that this description is illustrative only and the invention is not confined to what has been specifically described. For example, the reinforcing members could as well be formed from inorganic fibers other than glass fibers, from organic fibers, and from other natural and synthetic fibrous material, and for some applications metallic reinforcing members can be employed. Similarly, while thermosetting resins are preferred because they are easily handled, and the use of phenolic resins is familiar to those in the abrasive art, nevertheless the resins function essentially as binders, and other adhesive and cohesive binder materials can also be used. The abrasive particles may be any desired abrasive granular material, in substantially any desired and convenient practical particle size, including powders.

Figure 2:
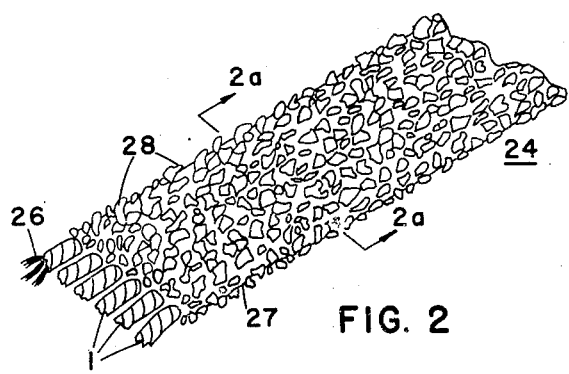
FIG. 2a is a fragmentary section on a more enlarged scale of this reinforced abrasive unit taken on the line 2a—2a of FIG. 2 looking in the direction of the arrows.
Figure 2A:
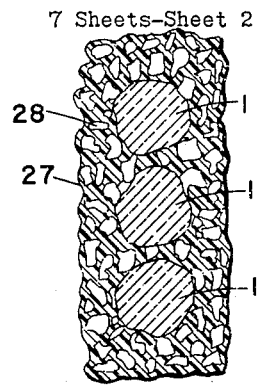

The material that is taken from the festoon dryer 22 is an elongate, coherent flexible reinforced abrasive unit that can be shaped and hardened. Referring now particularly to FIGS. 2 and 2a, the six strands 1 of the reinforced abrasive unit 24 are disposed substantially in parallelism, and extend longitudinally of the unit in an arrangement in which the strands in effect form a layer of reinforcing members that is one strand thick. Each strand 1 is formed from a plurality of glass fibers 26 that are mechanically twisted or plaited together.

The six strands 1 are bonded together and embedded in the slightly advanced phenolic resin bond 27. A plurality of abrasive grains 28 are distributed in the unit 24 about the strands 1 and particularly adjacent the surface of the unit. The distribution density of the abrasive grain is such that the grain has a depth of more than one grain, as shown in FIG. 2a in particular. Ordinarily, the advantages of this invention are best realized where the grain density is such as to provide a grain depth greater than one grain in the marginal portion of the unit in transverse section, but the grain density can be adjusted as desired through careful control of the rate of feed of the abrasive grain to the extrusion nip 17 in the apparatus illustrated in FIG. 1.

If the reinforced abrasive unit 24 is to be used itself for abrasive purposes, the resin is fully cured. Curing is completed so that the resin is fully hardened. After the resin has been cured, the elongate abrasive article can be used per se for polishing, grinding, and cutting, in strip or endless belt form. It is particularly useful, in endless belt form, for cutting metal rods.

Further to demonstrate the invention, several abrasive structures were made utilizing the reinforced abrasive unit, and are described in the following examples.

EXAMPLE 1

A Reinforced Grinding Wheel

Figure 3:
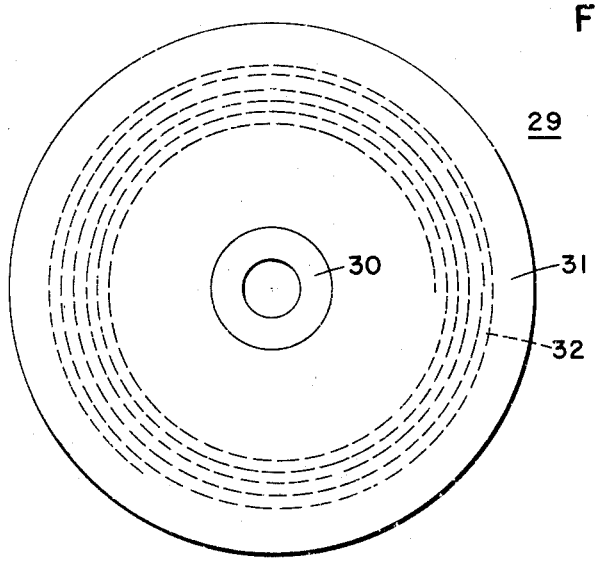
FIG. 3 is a top plan view, on a reduced scale, of a reinforced abrasive wheel of the bonded type, showing in dotted lines the position within the wheel of a reinforcing coil that is constructed in accordance with a preferred embodiment of this invention.

A grinding wheel, that was reinforced with a reinforcing element constructed in accordance with a preferred embodiment of this invention, is illustrated in FIG. 3. The wheel 29 was formed with a metal hub 30 about which a generally cylindrical abrasive body 31 was molded. A reinforcing element 32 was embedded within the abrasive body 31.

Figure 4:
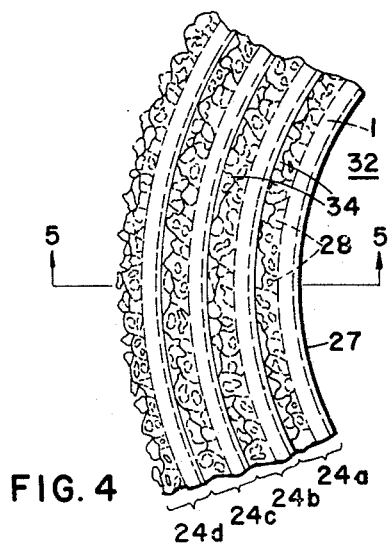
FIG. 4 is a fragmentary top plan view, on an enlarged scale, of the reinforcing coil used for reinforcing the wheel shown in FIG. 3.
Figure 5:
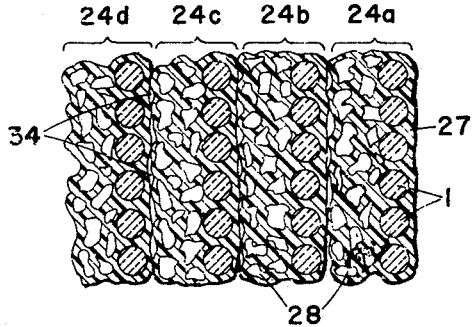
FIG. 5 is a section taken on the line 5—5 of FIG. 4, looking in the direction of the arrows, and showing a fragmentary radial section of the reinforcing coil.

The reinforcing element 32 was formed from a reinforced abrasive unit of generally rectangular section, having abrasive grain applied only at one of its sides. This modified reinforced abrasive unit was wound upon itself to form the generally cylindrically coiled reinforcing element 32. This coil, as shown fragmentarily in FIGS. 4 and 5, comprised several windings 24a, 24b, 24c, 24d and so on. In each pair of contiguous windings, the projecting peaks of the abrasive particles 28 engaged against the surface of the confronting winding, to provide a plurality of void spaces 34.

To make the reinforcing coil 32, the modified reinforced abrasive unit, in which the resin was advanced only sufficiently to permit handling and to leave the unit in a flexible, workable state, was wound into the desired coil shape. The shape was then heated to advance the resin further, and sufficiently to tack together contiguous portions of adjacent windings of the coil, to be self-sustaining.

To make the grinding wheel illustrated in FIG. 3, the mold for the wheel was partly charged with a conventional mixture of abrasive grain and resin bond. When the mold was approximately one-third to one-half filled with its normal charge of molding mix, the reinforcing coil 32 was positioned in the mold, and then the remainder of the mix was placed in the mold over the coil. Heat and pressure were then applied to cure the mix, and the bond softened and flowed into the void spaces 34. This produced an extremely strong and rigid reinforced structure in which columns or posts of the bond extended generally axially of the wheel and of the reinforcing coil, through the void spaces 34 between adjacent windings of the reinforcing coil.

This reinforced structure was extremely strong and rigid. Because the side of the abrasive unit that contained abrasive grain had an irregular surface, excellent bonding was obtained between the bond of the abrasive wheel and the reinforcing element. Moreover, when the wheel was used sufficiently to wear down to expose the reinforcing element, the reinforcing element itself participated in the grinding action.

In reinforcing bonded abrasive articles of the resinoid bonded type with reinforcing elements such as the coil just described, it is ordinarily preferred that the resin of the reinforcing element be cured simultaneously with the resinoid bond in the grain-bond mixture for the bonded article. This procedure makes the two bonds integral and is an additional strengthening factor.

The reinforcing coil, as shown in FIG. 3 in dashed lines, has relatively few windings, and is spaced radially from the hub 30 and from the periphery of the wheel 29. Such a reinforcing coil, although relatively small by comparison with the size of the wheel, had a tremendous strengthening effect upon the wheel. Where even greater strength is desired, the coil may be made with a larger number of windings, to have greater radial extent. If necessary, the coil may extend substantially from the hub of the wheel to its periphery.

EXAMPLE 2

A Reinforced Mounted Point

Figure 6:
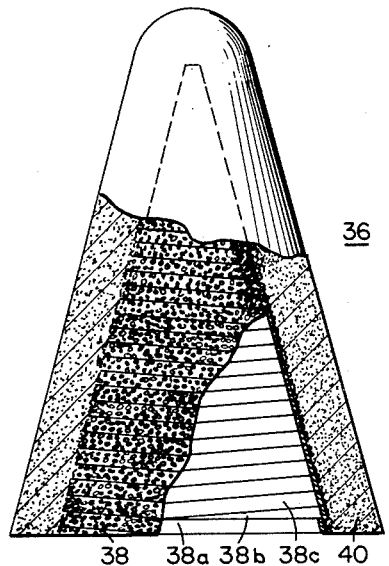
FIG. 6 is a side elevation, partly in section and partly broken away, of a mounted point that is reinforced in accordance with one embodiment of this invention.

Referring to FIG. 6, a mounted point 36 was made in accordance with this invention by reinforcing it with an element 38 of generally conical shape. A layer 40 of abrasive grain and bond was secured about the reinforcing element 38.

The conical reinforcing element 38 was formed from a plurality of windings 38a, 38b, 38c, and so on, of a reinforced abrasive unit, wound on a conical mandrel with their marginal edges in contact with the marginal edges of the adjacent windings. The reinforced abrasive unit was of the modified type that was employed in making the coil in Example 1; and this same modified unit was employed also in Examples 3, 4, 5 and 6, although the unit illustrated in FIG. 2 could have been used to substantially the same effect. The resin of the unit was advanced slightly after winding, to set it sufficiently so that the element was self-sustaining. A layer of a mixture of abrasive grain and bond was applied directly over the reinforcing element 38 while it was mounted on the mandrel, and was pressed and cured simultaneously to form the bonded layer 40.

The reinforced mounted point had greatly increased resistance to failure under centrifugal force, as compared to conventional mounted points, with no sacrifice in other desirable properties.

While the conical reinforcing element 38 was fabricated to have thickness of substantially only a single winding of the reinforced abrasive unit, a plurality of thicknesses could be used if additional strength is needed, by superposing successive windings upon the mandrel. In such a case, it is preferred that the second and any subsequent windings be wound with a greater pitch than the first winding so as to space the individual windings axially sufficiently to permit the mixture of grain and bond, from which the bonded layer 40 is formed, to have access to all of the windings of the reinforcing element.

EXAMPLE 3

A Reinforced Flared Cup Wheel

Figure 7:
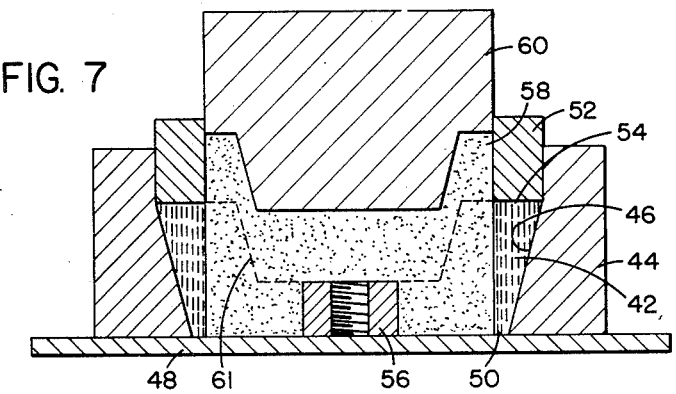
FIG. 7 is an axial section through a mold for producing a reinforced flared cup wheel in accordance with one embodiment of this invention, showing the plunger of the mold as it is about to begin its stroke, and showing by a dotted line the position of the plunger at the end of its stroke.

Referring now particularly to FIG. 7, a modified reinforced abrasive unit was also employed to make a reinforced flared cup wheel.

The reinforcing element 42 was made in the shape of a truncated cone, by winding the abrasive unit in successive layers upon a mandrel. As each successive layer of windings was applied on the mandrel, one or more windings was dropped off at one end as each layer was completed, to produce the truncated conical shape. When the element was properly shaped and fully formed on the mandrel, the resin bond was advanced sufficiently to make the element self-sustaining.

To use the reinforcing element 42 in the manufacture of a flared cup wheel, it was removed from the mandrel and placed in the lower part of a suitable open ended die member 44, that had a bore 46 with which the reinforcing element 42 conformed in shape. The die member 44 was supported on the bed 48 of a press, and the lower end of the reinforcing element 42 engaged at its narrow tip 50 on the press bed 48. A collar 52 was seated on the broad upper end 54 of the reinforcing element, and an internally threaded bushing 56 was placed centrally within the mold, to provide means for mounting the cup wheel on a spindle. The raw batch mix 58 of abrasive grain and resinoid bond was then placed in the mold, as shown. A shaped plunger 60 was employed to apply pressure to the raw batch, and to impart to it the desired shape. The dotted line, that is denoted generally by the numeral 61, indicates the final position of the plunger 60, and the shape of the flared cup wheel.

As heat and pressure were applied to the raw batch 58 in the mold, some of the raw batch mixture, particularly the bond, was forced into the interstices between the windings of the reinforcing element 42. The cup wheel was pressed and cured simultaneously, but it could have been pressed, then subsequently oven cured. The resin of the reinforcing element 42 and the resin bond of the raw batch mix 58 were cured simultaneously to produce a strong, monolithic, integral structure.

To secure an improved bond between the reinforcing element and the raw batch mix 58, the first few windings of the reinforcing element 42 on the mandrel can be axially spaced, to permit the raw batch mix to penetrate more readily into the reinforcing element.

Flared cup wheels that are produced according to my invention have exceptionally high resistance to failure. The circumferential reinforcing element 42 is simultaneously an internal and an external reinforcing element, and it is designed to have its greatest strength at the point of greatest stress. Reinforced flared cup wheels that are made in this manner often have sufficient strength so that no external guard is necessary; in effect, the internal reinforcing unit provides an expendable guard that is integral with the wheel.

This same fabrication technique can be applied to many different rotary abrasive elements, and eliminates the need for external reinforcing in most cases.

EXAMPLE 4

*Reinforced Sleeve Grinding Tool*

Figure 8:
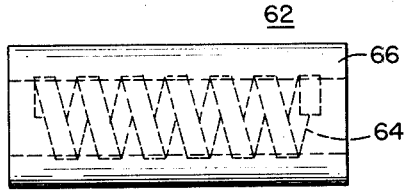
FIG. 8 is a side elevation of an elongate, sleeve-type rotary bonded abrasive element that is reinforced in accordance with another embodiment of this invention, the position of helically wound reinforcing element being shown by dotted lines.

A sleeve-type reinforced rotary abrasive tool 62 was made as shown in FIG. 8. This tool 62 comprised a helical reinforcing element 64 about which a layer 66 of resinoid-bonded abrasive grain was bonded.

To form the helical reinforcing element 64, the reinforced abrasive unit was wound on a mandrel of the proper diameter, with each winding axially spaced from the adjacent winding. A resinoid-type mix was pressed and cured about the element 64 on the mandrel to form the sleeve-type tool 62. In mass production, if the element 64 must be removed from the mandrel, it is preferred that the resin of the element be advanced slightly to be self-sustaining.

EXAMPLE 5

*Endless Abrasive Belt*

Figure 9:
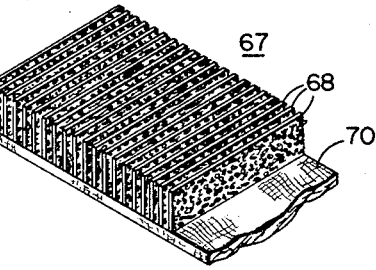
FIG. 9 is a fragmentary perspective view of an endless belt type of abrasive product made in accordance with another embodiment of this invention.

A reinforced abrasive unit was fabricated into a valuable abrasive article of the endless belt type, having the structure shown partially in FIG. 9. To make the endless abrasive belt 67, strips 68 were cut from a reinforced abrasive unit and were hingedly mounted along their respective lateral edges on a backing 70, with the irregular abrasive surfaces of the strips 68 disposed in one direction.

Such belts have the advantage that the individual strips 68 can carry a great deal more abrasive grain than can be successfully coated on one surface of a backing such as the backing 70. A belt having the structure shown in FIG. 9 has a much greater life expectancy than a belt made in the conventional manner. Moreover, the abrasive belt 67 has the advantage that as it is used, the reinforcing strands in the individual strips 68 are worn away progressively as the abrasive grain is used, and fresh abrasive grain is continuously exposed until eventually the strips 68 are entirely consumed.

EXAMPLE 6

*Reinforced, High Strength, Resin-Bonded Grinding Wheel*

A structure 73 was prepared for use as a blank for pressing to form an abrasive wheel. This structure comprised an Archimedes spiral or coil 71 that was formed by winding a length of the reinforced abrasive unit on a spindle, to form a spiral of the desired diameter. Several separate strips 72 were cut from a reinforced abrasive unit, and were then laid across one end face of the spiral 71. These strips 72 were laid in parallelism to each other and were uniformly spaced from each other. Other strips 74 were then laid on the opposite face of the spiral 71, in parallelism to each other and uniformly spaced from each other, and at right angles to the strips 72. All of the strips were trimmed to conform in size to the coil face across which they were laid. This assembly was then heated sufficiently to advance the resin to form a self-sustaining structure in which the strips were secured to the lateral edges of the coil windings with which they made contact.

The structure 73 was then placed in a press, and was simultaneously heated and pressed. The temperature was raised sufficiently to soften the resin to permit it to flow, and under the application of pressure, the structure was compacted. After cooling, a bonded grinding wheel 75 having the structure shown in FIGS. 12 and 13 was removed from the mold. Because of the compaction that occurred during pressing, the wheel 75 had a reduced thickness as compared to the structure 73 from which it was pressed.

The wheel 75 was used as a cut-off wheel for cutting "Transite" board, and excellent results were observed. There was no burning of the material, even though there was fast cutting action, indicating that the cutting action was cool.

Figure 12:
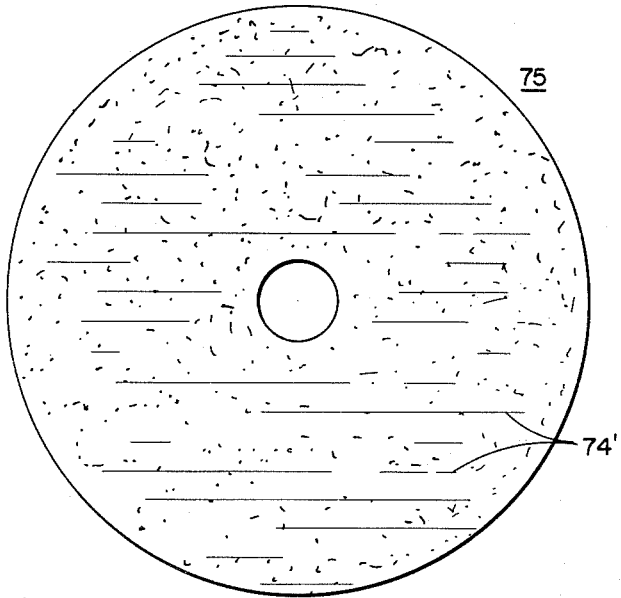
FIG. 12 is a top plan view of the grinding wheel that has been pressed from the assembly shown in FIG. 10.
Figure 13:
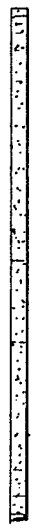
FIG. 13 is a side elevation thereof.

Although the wheel 75 had a substantially uniform diameter, except for irregularities caused by projecting abrasive grains, nevertheless the outlines of the strips 72, 74 were visible, as indicated generally in FIG. 12 by the lines 74' that are shown on the visible side of the wheel. The strips appeared to be responsible, however, for a sawtooth cutting action to which the fast, cool cutting action of the wheel is attributed.

Figure 10:
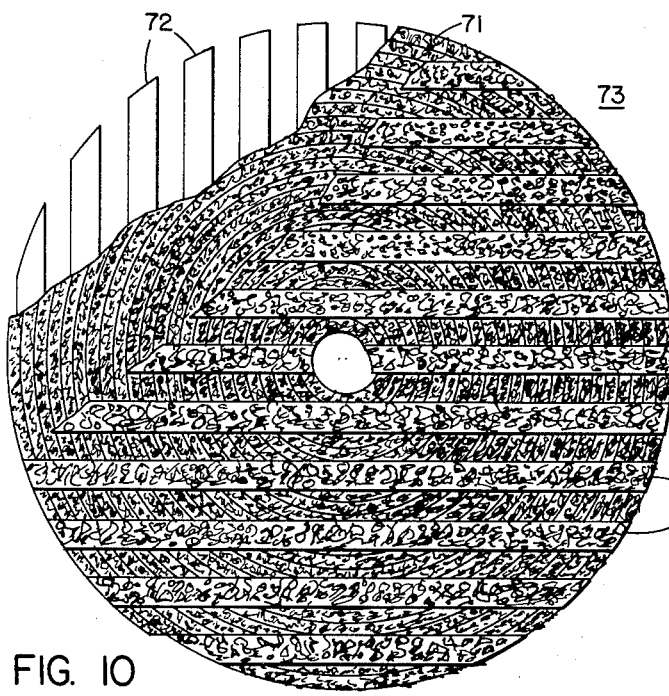
FIG. 10 is a top plane view of an assembly that can be pressed to form a bonded abrasive grinding wheel, the successive layers of the assembly being broken away, better to illustrate how the assembly is made.
Figure 11:
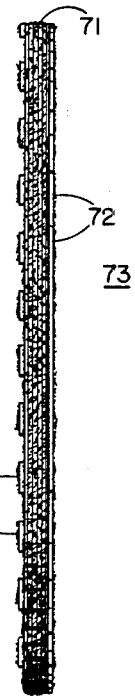
FIG. 11 is a side elevation thereof.

Excellent cutting action is also obtained from wheels that are made in a slightly different manner, by making the structure from a pair of coils and sandwiching the reinforcing strips between the coils, rather than sandwiching a single coil between the transverse strips as was done in the structure illustrated in FIG. 10. Other types of wheels embodying one or the other type of reinforcings in various arrangements can also be made.

In making a grinding wheel from an Archimedes spiral formed from a reinforced abrasive unit in the manner just described, it is ordinarily preferred to use the modified reinforced abrasive unit, as described in Example 1, that has abrasive grain embedded therein at one side of the layer of reinforcing strands only. One reason for this preference is that such a unit ordinarily will contain a greater proportion of resin by weight than the unit illustrated in FIGS. 2 and 2a, and the higher resin content is desirable to permit high speed rotary use of the wheel. However, reinforced abrasive units of the type illustrated in FIGS. 2 and 2a can also be used, and additional resin can be added to the mold before pressing if necessary.

The foregoing has related to a reinforced abrasive unit of ribbon-like form, and structures that can be fabricated from it. Many other interesting and important abrasive articles are available that are based upon reinforced abrasive units that have transverse sections other than generally rectangular, such as, for example, circular and triangular. The following description and examples are concerned with such other embodiments of the invention.

EXAMPLE 7

*Reinforced Abrasive Unit, Twisted*

A reinforced abrasive unit was made generally in accordance with the process described in connection with FIG. 1, using four glass fiber reinforcing strands. The phenolic resin was a commercial resin of a type commonly used in the abrasive industry and characterized generally as one-step liquid phenol-formaldehyde resins having a solids content of 50% to 60% by weight, viscosity in the range 175 to 300 cps. at 25° C., specific gravity at 25° C. of 1.08 to 1.12, and water tolerance of 10% to 70%. The resin in the ribbon-like extruded material was advanced by heating the material at approximately 200° F. for about ten minutes, so that it became limp, flexible, and could be easily shaped and fabricated, but was not appreciably tacky.

While still warm and workable, the unit was twisted sufficiently to assume a generally circular transverse section. The twisted reinforced abrasive unit was wound on spools for storage.

In practicing this process, the resin must be sufficiently advanced to retain the grain during twisting. Because twisting involves considerable internal rearrangement and stress within the abrasive unit, it is preferred that twisted units have a relatively small number of reinforcing strands, such as from two to four.

Heavier structures have been made by taking two or more of the twisted reinforced abrasive units, and twisting them together into a rope. Such a structure has unique characteristics because of the distribution of abrasive grain and reinforcing members throughout. It has exceptional strength and great durability under severe abrading conditions.

EXAMPLE 8

*Compacted Reinforced Abrasive Units*

While a reinforced abrasive unit is plastic, but not tacky, it can be presssed to convert it to a unit of a different cross-section, or several such units can be compacted to unite them.

Figure 14:
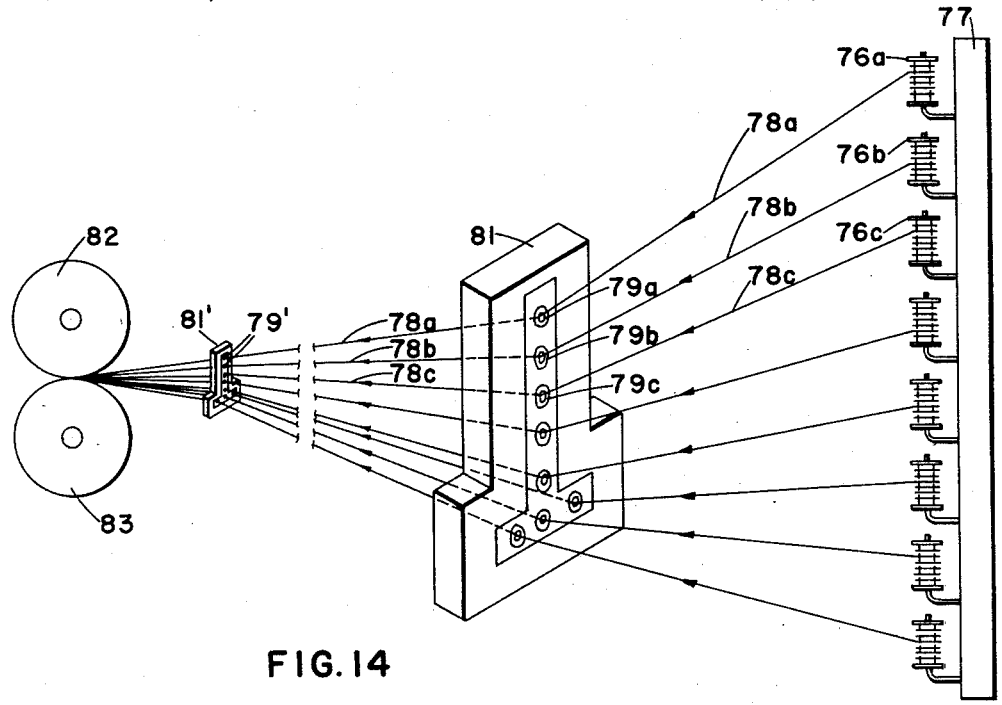
FIG. 14 is a fragmentary schematic diagram illustrating apparatus for collecting a plurality of reinforced abrasive units made in accordance with this invention, and compacting them to a unified shaped mass.
Figure 16:
FIG. 16 shows collectively, in transverse section and on an enlarged scale, the shapes of several compacted masses.

One device with which this has been accomplished can be described with reference to FIGS. 14, 15, and 16. A plurality of spools, 76a, 76b, 76c, etc., were mounted on a spool rack 77. Each of these spools was wound with a continuous length of a reinforced abrasive unit twisted from an extruded material containing four reinforcing strands, and having a substantially circular cross-section, and being still in a substantially plastic but non-tacky stage. The several twisted abrasive units 78a, 78b, 78c, etc., were led from their respective spools, 76a, 76b, 76c, etc., and were threaded respectively through porcelain guide eyes 79a, 79b, 79c, etc., in a guide holder 81, arranged in an inverted T-shape.

The abrasive units 78a, 78b, 78c, etc., were led from the holder 81 through guide eyes in several intermediate holders (not shown) of progressively reduced size, and finally through guide eyes 79' in a holder 81', which were also arranged in an inverted T-shape, but which were spaced very close together. The several holders brought the several units closer to the position each would assume when finally compacted to the desired shape. From the final set of guide eyes 79', the units were led between a pair of rollers 82, 83, for compaction.

Figure 15:
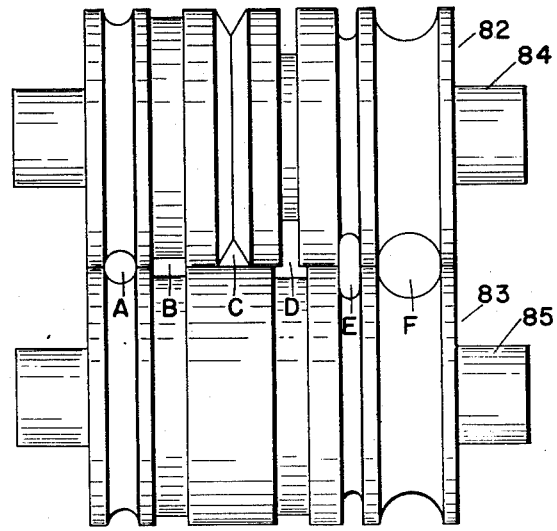
FIG. 15 is a side elevation, on an enlarged scale, of two exemplary rolls that can be employed for this compacting.

Referring now to FIG. 15 in particular, the roll 82 was mounted for rotation upon rotation of a drive shaft 84, and similarly, the roll 83 was mounted for rotation upon rotation of a drive shaft 85. The two rolls were formed with peripheral, complementary grooves, that aligned axially to form, at the nip between the rolls, dies having a desired cross-section as generally denoted in the drawing by A, B, C, D, E, and F respectively. The several dies A, B, C, D, E, and F are of different areas and shapes and some are intended to accommodate different amounts of input material.

The several abrasive units 78a, 78b, 78c, etc., gathered in the desired arrangement by the guide eyes in the several holders, were drawn through the die D between the two rolls 82, 83, and were compressed therein to form a compacted reinforced abrasive unit, having in transverse section an inverted T-shape, as illustrated in FIG. 16D.

The rolls 82, 83 were relied upon to compress the several plastic units together sufficiently to cause them to cohere. This compaction process should be distinguished from an extrusion process. The rate at which the several units 78a, 78b, 78c, etc., are compacted between the rolls 82, 83 depends upon the speed at which the drive shafts 84, 85 of these rolls are driven. The spools 76a, 76b, 76c, etc., are not driven, and the several abrasive units are paid out from their respective spools only because of the pull exerted by the two rolls 82, 83.

This same procedure has been employed to form compacted reinforced abrasive units having sections corresponding to those shown in FIGS. 16A, 16B, 16C, 16E and 16F, respectively, and to the respective shapes of the other dies A, B, C, E, and F, respectively. In each case, the guide eyes in the holders were arranged to gather the several individual abrasive units 78a, 78b, 78c, etc., in the proper orientation relative to each other before entering between the rolls 82, 83. For example, to make a compacted reinforced abrasive unit having a circular transverse section as illustrated in FIG. 16F, the individual twisted reinforced abrasive units 78a, 78b, 78c, etc. were led through a series of five guide holders (not shown). In each of these five guide holders, the individual guide eyes were arranged in a circle, and the holders were arranged so that the circle became progressively smaller from the spool rack 77 to the compression rolls 82, 83, and the circular array of abrasive units that was drawn into the nip between the rolls 82, 83 and pass through the die F had a diameter close to the diameter of the compacted product.

The twisted units produced in Example 7, and the compacted units produced in Example 8, have been found useful for a variety of applications. These units can be cured and employed as abrasive units themselves. They can be fabricated to make more complex structures while still plastic. They can be employed as reinforcing elements for incorporation in other abrasive articles. They can be fabricated into shapes, pressed, and cured, to make bonded abrasive articles. Many other applications for these units will occur to those skilled in the art.

EXAMPLE 9

*Abrasive Disc*

Several twisted, reinforced abrasive units, made in accordance with Example 7, were compacted in accordance with Example 8, to form a compacted reinforced abrasive unit having the transverse generally rectangular section illustrated in FIG. 16E. As the compacted unit issued from the rolls 82, 83, a tape was applied to one of its broad surfaces. The tape had a width approximately twice that of the compact unit, and was adhesively secured to the unit only over a portion of the broad face of the unit, to leave a substantial portion of the tape free, projecting from one side of the unit. The tape was made from neoprene-treated burlap, slit to the desired width.

Figure 17:
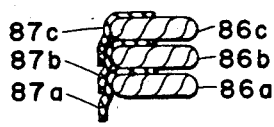
FIG. 17 is a fragmentary transverse section of a coil wound from a compacted mass of generally rectangular section having a tape secured across one of its broad faces with a free lateral portion thereof projecting from one side of the coil and folded radially inwardly over the lateral face of the coil.
Figure 18:
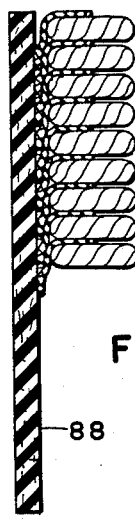
FIG. 18 is a fragmentary transverse section of the coil shown in FIG. 17, secured to a flexible backing.
Figure 19:
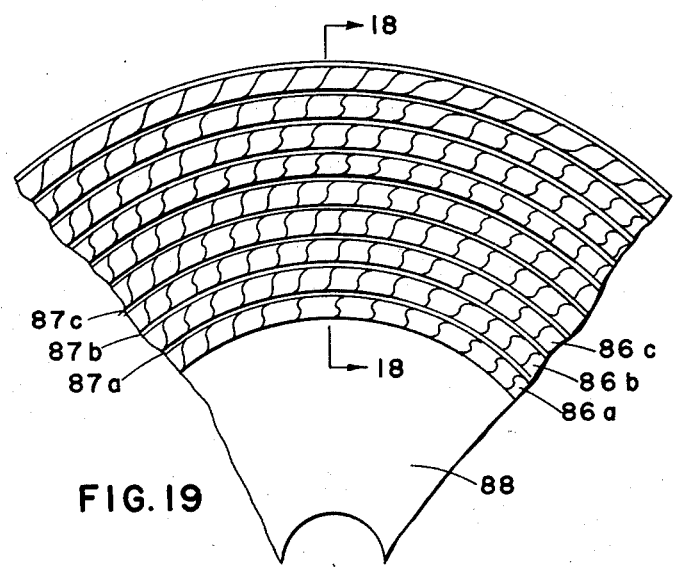
FIG. 19 is a fragmentary side elevation thereof.

This assembly was now wound in spiral form and the free marginal portion of the tape was turned radially inward, so that with each winding a portion of tape was folded over an underyling portion of tape on the radially inner winding. As illustrated fragmentarily in FIG. 17, this structure consisted of successive windings 86a, 86b, 86c, etc., of the compacted reinforced abrasive unit, disposed with their faces in contiguous and confronting relation. The tape that was secured partway across the broad face of the compacted reinforced abrasive unit has its free portion, in the successive windings of the assembly, turned radially inward relative to the spiral form of the assembly, to provide overlapped tape windings 87a, 87b, 87c, etc.

This spiral assembly was mounted on a flexible backing disc 88, and the assembly was then heated to cure it. The abrasive disc had very desirable grinding characteristics. It exhibited resilience in its abrading action, produced very fine finishes, and had a long life.

EXAMPLE 10

*Grinding Wheel Having Setup Wheel Grinding Characteristics*

A grinding wheel was produced that had the desirable characteristics of the ordinary setup wheel and, in addition, an effective life many times that of the ordinary setup wheel.

Figure 20:
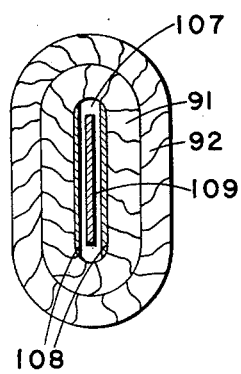
FIG. 20 is a transverse section of a pair of reinforced abrasive units wound in superposition and in opposite respective directions on a three-piece mandrel.
Figure 21:
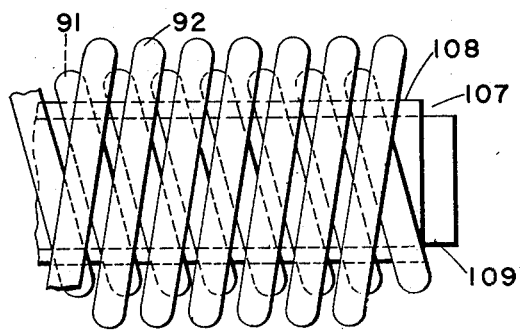
FIG. 21 is a fragmentary side elevation thereof.

Referring now particularly to FIGS. 20 and 21, two lengths of a twisted reinforced abrasive unit, having a generally circular cross-section, were wound upon a mandrel 107, one wound over the other, and spiralled in different directions. The mandrel 107 was formed from a loose assembly of three metal bars, two outer bars 108 and an inner bar 109. The inner bar 109 was disposed to project from between the two outer bars at one end of the mandrel, to facilitate later withdrawal of the inner bar 109.

To wind the material on the mandrel, a pair of spools (not shown), each containing a length of a twisted reinforced abrasive unit, were mounted on rotating discs on a machine similar to a cable winding machine. One of the discs was rotated clockwise, and the other counter-clockwise, and the two lengths were wound upon the mandrel to form an inner winding 91 from one spool, and an outer winding 92 from the other spool. The wound mandrel was heated to advance the resin in the windings sufficiently to fix the windings in position relative to each other but to leave them sufficiently flexible to permit further shaping. Such wound assemblies, after curing, are useful themselves for abrasive purposes. The mandrels can be used conveniently for mounting the assemblies in a holder.

To make a grinding wheel, a single continuous wrapping of a twisted reinforced abrasive unit, having a generally circular cross-section, was made on a rectangular mandrel. The assembly was then heated sufficiently to advance the resin to make the winding or wrapping self-sustaining but not completely rigid. The mandrel was then removed, by withdrawing the center bar 109, then the two side bars 108.

Figure 22:
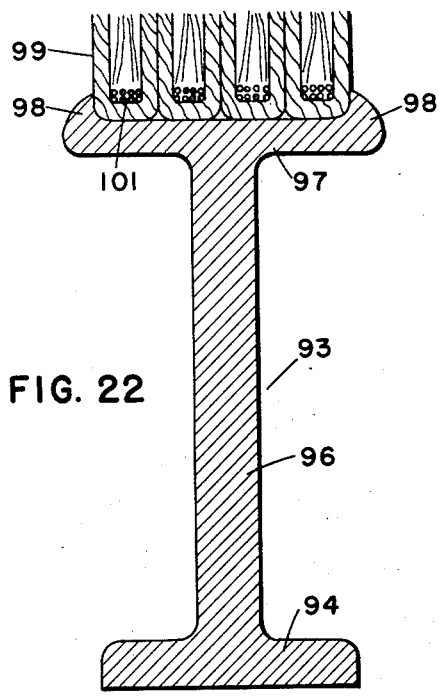
FIG. 22 is a fragmentary transverse section of a grinding wheel having an abrasive element that is made in accordance with another embodiment of this invention.

Referring now particularly to FIG. 22, this single wrapping was then wound on the periphery of a wheel 93. This wheel was formed with a hub portion 94, a radially-extending web 96, and a peripheral, axially extending rim 97. The rim 97 was formed with a pair of radially projecting and axially spaced retainer rings 98, and the wrapping was wound spirally about the rim 97, from the ring at one side of the rim to the ring at the other side. The spirally-wound wrapping on the wheel was then slit, with a narrow face cutoff wheel, to open the wrapping and to change its section to a generally U-shaped section 99, as shown in FIG. 22. Nylon yarn 101 was then inserted between the open arms of the U-shaped winding and was wound around the wheel under tension, as a retainer. For further strength, a small amount of a solution of a resinous adhesive was applied over the nylon yarn to cement it firmly in place.

The total number of free abrasive ends projecting radially from this wheel was very large. The exposure of abrasive grain, about the periphery of the wheel, was substantially continuous. The wheel was used very effectively for several different grinding applications and was characterized by the production of a fine finish, high resilience, and long life. Effective grinding action was obtained until the abrasive material had been worn away down to the rings 98.

Grinding wheels can also be successfully made where the wrapping that is applied about the periphery of the wheel 93 is a multiple wrapping rather than a single wrapping, and can be used very advantageously where the individual abrasive unit, from which the wrappings are made, has a relatively small diameter.

A single wheel base 93 can be used over and over again, by removing the abrasive material at it is worn down, and reloading the hub with new material. Simple winding devices can be employed for reloading hubs.

In practicing this embodiment of the invention, the mandrel may have any shape desired, such as elliptical or triangular. When the windings on the mandrel are made at a pitch such that the adjacent windings are axially spaced apart rather than contiguous, the wrapping is spring-like; that is, it is extendable and compressible. If the mandrel or base is a flat disc having a center opening, and the windings are made radially about the disc, extending from the center opening in a generally radial direction to the periphery and back again, the mandrel will become a permanent part of the structure and can function as the base of the abrasive disc or wheel thus formed.

EXAMPLE 11

Resilient Endless Belt

Figures 23, 24:
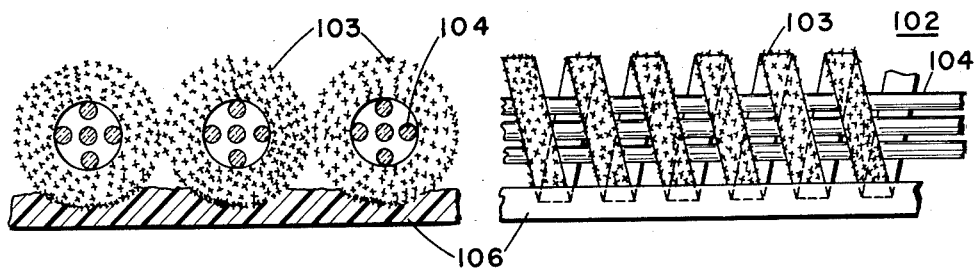
FIG. 23 is a fragmentary side elevation on an enlarged scale of one portion of an endless abrasive belt constructed in accordance with still another embodiment of the invention.
FIG. 24 is a fragmentary transverse section of this belt.

Referring now particularly to FIGS. 23 and 24, a very useful resilient endless abrasive belt 102 has been constructed, based upon an abrasive element in which a reinforced abrasive unit 103 was wound spirally on a core 104 that was formed either from a plurality of separate linear-filiform members as shown, such as monofilament material, or alternatively, from a rope. Nylon is a preferred material for this purpose, and nylon strands or rope can be employed.

To make the abrading element, the core 104 was placed under high tension, and a reinforced abrasive unit was wound on the core at a substantially uniform pitch at which adjacent windings were spaced apart axially. After curing this element is a useful abrading element in its own right. To make the belt, however, it was left in the workable but non-tacky stage.

A belt carcass 106 was then formed on a drum of the desired diameter. The carcass was made of burlap treated with neoprene. The composite abrasive element was wound spirally on the carcass with the adjacent windings contiguous, as indicated in FIG. 24, to cover the carcass. The carcass was then heated to cure the resin in the abrasive element and to vulcanize the backing. The abrasive element was retained on the backing by the combined retention of the core 104 and by adhesion.

The belt was then removed from the drum and flexed. Very good results were obtained in several different grinding applications with this belt. As the belt wore down, there was a successive exposure of abrasive grain, and a very efficient cutting action. There was a continuous self-dressing action because of the structure of the belt, which provided a constant exposure of sharp facets of the abrasive grains. The cutting action resembled, to a considerable degree, that of a vitrified wheel of very open porosity with very small grain.

In making abrasive elements of this type, in which a reinforced abrasive unit is wound upon a linear, resilient core, the actual size of the core can be adjusted over a wide size range. For use with a reinforced abrasive unit containing fine abrasive grain, for example, the core may have a diameter of about $1/16''$; for coarse grain sizes, the core diameter may be $1/8''$. The outside diameter of the element may be $1/8''$ to $1/4''$, or even more, depending upon the grit size of the abrasive grain in the unit. Axial spacing between adjacent windings of the unit on the core exposes the lateral sides of the abrasive unit for cutting action and also enhances the flexibility and resiliency of the structure.

When an open composite abrasive element is made by spirally wrapping a core, the abrasive element that is obtained is analogous to that formed from a large number of abrasive segments that are joined together. To carry the analogy further, referring to FIG. 24, each winding of the abrasive element carcass 106 can be regarded as a leaf spring, in which each individual winding of the reinforced abrasive unit 103 about its core 104 can be regarded as a leaf in the spring. The structure of the belt provides mobility in the sense that there is some freedom of movement between individual particles of abrasive grain that are disposed at the grinding face of the belt. Moreover, the structure is resilient by reason of the resilient characteristics of the wound reinforced abrasive unit 103, in addition to the resilience derived from the cushioning effect of the core 104 on which the unit is wound.

The foregoing specific examples describe this invention in terms of specific abrasive structures that represent preferred embodiments of the invention. It will be understood, however, that the new module for abrasive fabrication that is disclosed herein, in the form of a reinforced abrasive unit, can readily be made up into many other abrasive products of diverse nature.

In the preceiding description and in the claims that follow, the word "bundle" is used to refer to a group of mostly parallel or at least uniformly spaced linear-filiform members, such as, for example, monofilaments, strands, wires, and the like.

In making the reinforced abrasive units in accordance with this invention, ordinarily a bundle of linear-filiform reinforcing memers are employed, although in some cases a single reinforcing member could be used. The reinforcing members preferably are yarns or strands that are made from a plurality of twisted or plaited glass fibers. Other fibrous materials can also be used, such as, for example, rayon, nylon, and inorganic or ceramic fiber material such as fibrous aluminum silicate. Yarns or strands are preferred because of their strength, but monofilamentary material such as rayon and nylon, for example, is useful. Flexible metal wires, such as copper, aluminum, and steel wires, can also be used where great strength is required. Yarns made of mixed fibers are also contemplated. For example, yarns made from intimate fiber blends containing aluminum silicate and asbestos fibers, or containing inorganic fibers and organic carrier fibers, such as aluminum silicate ceramic fibers and acrylic carrier fibers, have the advantages of good strength and refractoriness and are useful in making abrasive products for high speed grinding applications.

The particular reinforcing materials selected will depend upon the demands of the application. For making an edge cutting abrasive belt, for example, the reinforcing strands preferably would be formed from textile fibers.

The words "yarn" and "strand" are used interchangeably herein to denote mechanically connected fibers or filaments, that is, twisted or plaited fibers or filaments. The term "filament" is used to refer to continous or elongate threadlike material, as a nylon or rayon monofilament, for example, or a wire.

In making the reinforced abrasive units, several different bonding materials may be employed. In general, the phenolic resins are preferred because of their good characterisics, ready availability, and because of the familiarity of workers in the abrasive arts with these resins. Animal hide glue, certain of epoxy reins, some of the synthetic rubbers, and other similar suitable binder materials can also be used.

The abrasive grain that is employed may be a finely powdered abrasive such a rouge or tripoli; or ordinary commercial abrasive grain in the customary range of grit sizes, including silicon carbide, crushed fused alumina, garnet, and the like. The grit size employed will depend upon the intended application; i.e., coarse grits would be used for rough grinding, medium grits for antiskid applications, fine grits for finishing, and powders for polishing.

Among other applications for the reinforced abrasive units of this invention, that will occur to those skilled in the art, it should be mentioned that it is contemplated that these units can be fashioned into excellent reinforcing elements for abrasives that are made from flexible fibrous webs that contain included abrasive grain.

While the invention has been described in connection with specific embodiments thereof, it will be understood that it is capable of further modification, and this application is intended to cover any variations, uses, or adaptations following, in general, the principles of the invention and including such departures from the present disclosure as come within known or customary practice in the art to which the invention pertains and as may be applied to the essential features hereinbefore set forth, and as fall within the scope or the limits of the appended claims.

I claim:

1. An elongate coherent flexible mass that can be shaped and hardened comprising a resinous matrix that is advanced sufficiently to permit handling, abrasive grains distributed in depth in said mass and at the surface of said mass and bonded in position by said matrix, and a bundle of separate flexible linear-filiform reinforcing members embedded within and disposed to extend generally longitudinally of said mass.

2. A mass in accordance with claim 1 in which said reinforcing members are juxtaposed to form a reinforcing layer having in transverse section a substantially uniform thickness substantially equivalent to the thickness of a single one of said members.

3. A shaped, elongate reinforced abrasive article comprising a matrix of a heat-hardened resin, abrasive grains distributed in depth in and at the surface of said article and bonded in position by said matrix, and a bundle of separate linear-filiform reinforcing members embedded within said matrix, said members being disposed to extend generally longitudinally of said article.

4. An abrasive article in accordance with claim 3 in which said reinforcing members are juxtaposed to form a reinforcing layer having in transverse section a substantially uniform thickness substantially equivalent to the thickness of a single one of said members and about which the abrasive grains and the portion of the matrix bonding the grains are substantially uniformly disposed on at least two opposite sides of said layer.

5. A shaped elongate reinforced abrasive article comprising a matrix of a heat-hardened resin, abrasive grains distributed in said matrix adjacent and at the surface of said article in sufficient distribution density that in transverse section the article has an integral marginal portion formed from a resin-bonded layer of grains more than one grain in depth, and a bundle of separate linear-filiform reinforcing members embedded within said matrix and disposed to extend generally longitudinally of said article.

6. An abrasive article in accordance with claim 5 in which said reinforcing members are juxtaposed to form a reinforcing layer having in transverse section a substantially uniform thickness substantially equivalent to the thickness of a single of said members and about which the abrasive grains and the portion of the matrix bonding the grains are substantially uniformly disposed on at least two opposite sides of said layer.

7. An abrasive article in accordance with claim 5 in which said reinforcing members are strands and in which each of said strands is formed from a plurality of glass fibers that are twisted together.

8. A coiled abrasive article comprising a continuous elongate element having a resinous matrix, abrasive grains distributed in depth in and at the surface of said element and bonded in position by said matrix, at least some of the abrasive grains at the surface of said element being disposed to project from said surface, and a bundle of linear-filiform reinforcing members embedded within said matrix and disposed to extend generally longitudinally of said element, said element being coiled upon itself with the confronting surfaces of adjacent windings of the coil spaced apart by the abrasive grains projecting therefrom.

9. An article in accordance with claim 8 in which the reinforcing members in said element are juxtaposed to form a reinforcing layer having in transverse section a substantially uniform thickness substantially equivalent to the thickness of a single member and about which the abrasive grains and the portion of the matrix bonding the grains are substantially uniformly disposed on at least two opposite surfaces thereof in such fashion that said element has greater width than thickness in a section transverse to its length.

10. A monolithic abrasive article of the type in which a mass of abrasive grain is held together by a bond which article contains an elongate reinforcing element embedded in said article, said element comprising a matrix of a heat-hardened resin, abrasive grains distributed in depth in and at the surface of said element and bonded in position by said matrix, and a bundle of linear-filiform reinforcing members embedded within said matrix, said members being disposed to extend generally longitudinally of said element.

11. An abrasive article of the rotary, bonded type having a body of abrasive grain that is held in a monolithic structure by a bond, and an elongate reinforcing element embedded in said body, said element being coiled about an axis that is substantially coaxial with the axis of rotation of said article, having confronting surfaces in adjacent windings thereof spaced apart, and comprising a matrix of a heat-hardened resin, abrasive grains distributed in depth in and at the surface of said element and bonded in position by said matrix, and a bundle of linear-filiform reinforcing members embedded within said matrix, said members being disposed to extend generally longitudinally of said element, the body of said bonded article extending about the surfaces and between the confronting surfaces of said coiled reinforcing element.

12. A reinforced rotary abrasive article of the mounted point type comprising a body of bonded abrasive grain having bonded therein in reinforcing relation a generally conical reinforcement comprising a plurality of juxtaposed windings of an elongate reinforced abrasive element having a matrix of a heat-hardened resin, abrasive grains distributed in depth in and at the surface of said element and bonded in position by said matrix, and a bundle of linear-filiform reinforcing members embedded within said matrix, said members being disposed to extend generally longitudinally of said element.

13. An abrasive article of the rotary bonded abrasive type, having an elongate sleeve-like body and containing as an integral part thereof, a reinforcing element, said element comprising a matrix of a heat-hardened resin, abrasive grains distributed in depth in and at the surface of said element and bonded in position by said matrix, and a bundle of linear-filiform reinforcing members embedded within said element, said members being disposed to extend generally longitudinally of said element, and said element being arranged in the form of a helical coil wound about an axis that is substantially coaxial with the axis of rotation of said article.

14. An abrasive device comprising a plurality of substantially uniform abrasive strips mounted on a support, each of said strips being a lengthwise segment of an abrasive element having a matrix of a heat-hardened resin, abrasive grains distributed in depth in and at the surface of said element and bonded in position by said matrix, and a bundle of linear-filiform reinforcing members embedded therein, said members being disposed to extend generally longitudinally of said element, each of said strips being secured to said support along a lateral edge thereof so that the individual strips overlap one another in the direction of movement of the device during use, and said strips forming a plurality of separate abrading units constituting the working face of the abrasive device, each said abrading unit being hingedly mobile so as to have individual mobility.

15. An abrasive article that is fabricated from different lengths of an elongate abrasive element having a heat-hardened resin matrix, abrasive grains distributed in depth in and at the surface of said matrix and bonded in position by said matrix, and a bundle of linear-filiform reinforcing members embedded in said matrix and disposed to extend generally longitudinally of said element, said article comprising a first length of said element that is in the form of a coil having a transverse face, and other lengths of said element that are bonded across said transverse face to successive windings of said coil to secure together a plurality of the windings of said coil.

16. An abrasive article that is fabricated from different lengths of an elongate abrasive element having a heat-hardened resin matrix, abrasive grains distributed in said matrix adjacent and at the surface of said element in sufficient distribution density that in transverse section the element has an integral marginal portion formed from a resin-bonded layer of grains more than one grain in depth, and a bundle of linear-filiform reinforcing members embedded in said matrix and disposed to extend generally longitudinally of said element, and said reinforcing members being juxtaposed to form a reinforcing layer having in transverse section a substantially uniform thickness substantially equivalent to the thickness of a single one of said members and about which the abrasive grains and the portion of the matrix bonding the grains are substantially uniformly disposed on at least two opposite sides of said layer, said article comprising a first length of said element that is wound as a cylindrical coil, and a plurality of other lengths of said element that are secured across a transverse face of said coil to successive windings of said coil and that are disposed substantially in parallelism to each other.

17. An abrasive article in accordance with claim 16, including a second plurality of lengths of said element that are secured to the other transverse face of said coil and that are disposed substantially in parallelism relative to each other and at right angles to said first-named plurality of lengths.

18. A rotary abrasive disc for side face grinding comprising a flexible backing, and as the active abrasive portion of said disc, an elongate ribbon of abrasive material that is wound as an Archimedes spiral with its broad faces confronting each other and that is secured to said backing at one lateral face of said spiral, said ribbon comprising a matrix of a heat-hardened resin, abrasive grains distributed in depth in and at the surface of said ribbon and bonded in position by said resin, and a bundle of separate linear-filiform reinforcing members juxtaposed in a layer having in transverse section a substantially uniform thickness substantially equivalent to the thickness of a single one of said members, said members being embedded in said resin and disposed to extend generally longitudinally of said ribbon.

19. An abrasive article comprising an elongate substantially rigid mandrel and an elongate reinforced abrasive unit secured on said mandrel and wound thereon in a coil about an axis that extends lengthwise of said mandrel, said unit comprising a heat-hardened resin matrix, abrasive grains distributed in said matrix adjacent and at the surface of said unit in sufficient distribution density that in transverse section the unit has an integral marginal portion formed from a resin-bonded layer of grains more than one grain in depth, and a bundle of separate linear-filiform reinforcing members embedded within said matrix and disposed to extend generally longitudinally of said unit.

20. A rotary abrasive article comprising a wheel having a rim, and an active abrasive body mounted on said rim, said body being formed from segments that are generally U-shaped in radial planes, said body being mounted on said rim with the free ends of said segments projecting radially outwardly therefrom, each of said segments being formed from an elongate reinforced abrasive unit having a matrix of a heat-hardened resin, abrasive grains distributed in depth in and at the surface of said unit and bonded in position by said resin, and a bundle of separate linear-filiform reinforcing members embedded in said resin, said members being disposed to extend generally longitudinally of said unit, and means retaining said segments on said rim.

21. An abrasive article comprising an elongate linear core of resilient material and an elongate reinforced abrasive unit spirally wound on said core about an axis that extends substantially longitudinally of said core, said unit comprising a matrix of a heat-hardened resin, abrasive grains distributed in depth in said matrix adjacent and at the surface of said unit in sufficient distribution density that in transverse section the unit has an integral marginal portion formed from a resin-bonded layer of grains, and a bundle of separate linear-filiform reinforcing members embedded within said matrix and disposed to extend generally longitudinally of said unit, said heat-hardened resin holding said unit in spiral form about said core.

22. An endless abrasive belt comprising an endless backing, and an elongate abrasive element of relatively narrow width relative to the width of said backing disposed in abrading position on the surface of said backing, said element being spirally wound on the surface of said backing about an axis that extends generally axially relative to the rotation of said belt, and said element comprising an elongate linear core of resilient material and an elongate reinforced abrasive unit spirally wound on said core about an axis that extends substantially longitudinally of said core, said unit comprising a resin matrix, abrasive grains distributed in depth in and at the surface of said unit and bonded in position by said resin matrix, and a bundle of separate linear-filiform reinforcing members embedded within said matrix, said members being disposed to extend generally longitudinally of said unit, said resin being heat-hardened to hold said unit in spiral form about said core, and means bonding said abrasive element to said backing.

References Cited in the file of this patent

UNITED STATES PATENTS

| | | |
|---|---|---|
| 2,232,389 | Jurkat | Feb. 18, 1941 |
| 2,284,715 | Benner | June 2, 1942 |
| 2,404,207 | Ball | July 16, 1946 |
| 2,643,494 | Erickson | June 30, 1953 |
| 2,680,335 | Hurst | June 8, 1954 |
| 2,730,848 | Wallace et al. | Jan. 17, 1956 |
| 2,749,682 | Patrito | June 12, 1956 |
| 2,760,313 | Harvey | Aug. 28, 1956 |
| 2,763,105 | Feeley | Sept. 18, 1956 |
| 2,796,337 | Block | June 18, 1957 |
| 2,899,288 | Barclay | Aug. 11, 1959 |